United States Patent
Bilbao et al.

(10) Patent No.: US 12,374,905 B2
(45) Date of Patent: Jul. 29, 2025

(54) APPARATUS AND METHOD FOR PROTECTING AGAINST SIDE-CHANNEL ATTACKS DURING DEVICE CHARGING

(71) Applicant: Texas Tech University System, Lubbock, TX (US)

(72) Inventors: Argenis Bilbao, Lubbock, TX (US); Richard Matovu, Erie, PA (US); Abdul Serwadda, Lubbock, TX (US); Isaac Griswold-Steiner, Mountain View, CA (US)

(73) Assignee: Texas Tech University System, Lubbock, TX (US)

( * ) Notice: Subject to any disclaimer, the term of this patent is extended or adjusted under 35 U.S.C. 154(b) by 630 days.

(21) Appl. No.: 17/687,504

(22) Filed: Mar. 4, 2022

(65) Prior Publication Data

US 2022/0284136 A1    Sep. 8, 2022

Related U.S. Application Data

(60) Provisional application No. 63/156,503, filed on Mar. 4, 2021.

(51) Int. Cl.
*H02J 7/00* (2006.01)
*G06F 21/55* (2013.01)
*G06F 21/85* (2013.01)
*H03H 11/46* (2006.01)
*H03K 3/84* (2006.01)

(52) U.S. Cl.
CPC .......... *H02J 7/0029* (2013.01); *G06F 21/554* (2013.01); *G06F 21/85* (2013.01); *G06F 2221/034* (2013.01); *H03H 11/46* (2013.01); *H03K 3/84* (2013.01)

(58) Field of Classification Search
CPC .. H02J 7/0029; H02J 7/00032; H02J 7/00034; H02J 7/00036; H02J 7/00038; H02J 7/00045; G06F 21/554; G06F 21/85; G06F 2221/034; H03H 11/46; H03K 3/84
USPC .......................................................... 320/137
See application file for complete search history.

(56) References Cited

U.S. PATENT DOCUMENTS

| | | | | |
|---|---|---|---|---|
| 2012/0056683 | A1* | 3/2012 | Tang | H03K 3/84 |
| | | | | 331/78 |
| 2013/0015900 | A1* | 1/2013 | Lisart | G06K 19/07309 |
| | | | | 327/306 |

(Continued)

OTHER PUBLICATIONS

Ambrose, J. A., et al., 2012. Randomized instruction injection to counter power analysis attacks. ACM Transactions on Embedded Computing Systems (TECS) 11, 3 (2012), 69.

(Continued)

*Primary Examiner* — Nathaniel R Pelton
(74) *Attorney, Agent, or Firm* — Daniel J. Chalker; Edwin S. Flores; Chalker Flores, LLP

(57) ABSTRACT

Two defense mechanisms, a hardware-based and software-based solution, are provided to protect a device during charging. The defenses randomly perturb the current drawn during charging thereby masking the unique patterns of the user's activities. It is shown that the two defenses force each one of the attacks to perform no better than random guessing, thus acting as effective defense mechanisms against all such types of attacks.

16 Claims, 6 Drawing Sheets

(56) References Cited

U.S. PATENT DOCUMENTS

2017/0061121 A1* 3/2017 Rivoir .................. G06F 21/755
2017/0264124 A1* 9/2017 Balakrishnan .... H02J 7/007182

OTHER PUBLICATIONS

Breiman, L., 2001. Random forests. Machine learning 45, 1 (2001), 5-32.
Carbonfund.org. 2019. How We Calculate. Retrieved Dec. 4, 2019 from http://www.carbonfund.org/how-we-calculate.
Carette, A., et al 2017. Investigating the energy impact of android smells. In 24th International IEEE Conference on Software Analysis, Evolution and Reengineering (SANER). IEEE, 10.
Carroll, A. and G. Heiser. 2013. The systems hacker's guide to the galaxy energy usage in a modern smartphone. In Proceedings of the 4th Asia-Pacific Workshop on Systems. ACM, 5.
Carroll, A., et al., 2010. An Analysis of Power Consumption in a Smartphone. In USENIX annual technical conference, vol. 14. Boston, MA, 21-21.
Castelluccia, C. and P. Mutaf. 2005. Shake them up!: a movement-based pairing protocol for cpu-constrained devices. In Proceedings of the 3rd international conference on Mobile systems, applications, and services. ACM, 51-64.
Chai, F., and K.-D. Kang. 2018 "A New Power Analysis Attack and a Countermeasure in Embedded Systems." 2018 9th IEEE Annual Ubiquitous Computing, Electronics & Mobile Communication Conference (UEMCON).
Chang, C.-C. and C.-J. Lin. 2011. LIBSVM: A library for support vector machines. ACM transactions on intelligent systems and technology (TIST) 2, 3 (2011), 27.
Google. 2019. Google Play Books. Retrieved Dec. 4, 2019 from https://play.google.com/store/apps/details?id=com.google.android.apps.books.
Google. 2019. Google Fit. Retrieved Dec. 4, 2019 from https://www.google.com/fit/.
Joshua Ho. 2019. The Samsung Galaxy S6 and S6 Edge Review. Retrieved Dec. 4, 2019 from https://www.anandtech.com/show/9146/the-samsung-galaxy-s6-and-s6-edge-review/3.
Kocher, P. C., et al. 1999. Differential Power Analysis. In Proceedings of the 19th Annual International Cryptology Conference on Advances in Cryptology (Crypto '99). Springer-Verlag, Berlin, Heidelberg, 388-397. http://dl.acm.org/citation.cfm?id=646764.703989.
Lifshits, P., et al. 2018. Power to peep-all: Inference Attacks by Malicious Batteries on Mobile Devices. Proceedings on Privacy Enhancing Technologies 2018, 4 (2018), 141-158.
LLC WebMD. 2019. WebMD. Retrieved Dec. 4, 2019 from https://play.google.com/store/apps/details?id=com.webmd.android.
Masoumi. M. 2019. Novel Hybrid CMOS/Memristor Implementation of the AES Algorithm Robust against Differential Power Analysis Attack. IEEE Transactions on Circuits and Systems II: Express Briefs (2019), 1-1. https://doi.org/10.1109/ TCSII.2019.2932337.
Qin, Y. and C. Yue. 2018. Website Fingerprinting by Power Estimation Based Side-Channel Attacks on Android 7. In 2018 17th IEEE International Conference on Trust, Security and Privacy in Computing and Communications/12th IEEE International Conference on Big Data Science and Engineering. IEEE, 1030-1039.
Scikit learn. 2019. Machine Learning in Python. Retrieved Dec. 9, 2019 from https://scikit-learn.org/stable/.
SyNetDev. 2019. Stay Alive! Keep screen awake. Retrieved Dec. 4, 2019 from https://play.google.com/store/apps/details?id=com.synetics.stay alive&hl=en.
The FAA. 2019. Air Traffic by the Numbers. Retrieved Dec. 4, 2019 from https://www.faa.gov/air_traffic/by_the_numbers/.
The Pokemon Company. 2019. Pokemon Go. Retrieved Dec. 4, 2019 from https://www.pokemongo.com/en-us/.
The Veloxity Team. 2019. Survey Report: Cell Phone Battery Statistics 2015-2018. Retrieved Dec. 4, 2019 from https://veloxity.us/2015-phone-battery-statistics/.
United States Environmental Protection Agency. 2019. Greenhouse Gas Emissions from a Typical Passenger Vehicle. Retrieved Dec. 4, 2019 from https://www.epa.gov/greenvehicles/greenhouse-gas-emissions-typical-passenger-vehicle.
Yan, Lin et al. 2015. "A study on power side channels on mobile devices". In Proceedings of the 7th Asia-Pacific Symposium on Internetware. ACM, 30-38.
Yang, et al. 2017. "On inferring browsing activity on smartphones via USB power analysis side-channel". IEEE Transactions on Information Forensics and Security 12, 5 (2017), 1056-1066.

* cited by examiner

Attack vs Defense Scenario.

Defense vs Defense Scenario.

CPU utilization.

Memory utilization.

//  APPARATUS AND METHOD FOR PROTECTING AGAINST SIDE-CHANNEL ATTACKS DURING DEVICE CHARGING

CROSS-REFERENCE TO RELATED APPLICATIONS

This application claims priority to and is a nonprovisional patent application of U.S. provisional patent application serial number 63/156,503 filed on Mar. 4, 2021 and entitled "Apparatus and Method for Protecting Against Side-Channel Attacks During Device Charging." The contents of the foregoing application is hereby incorporated by reference in its entirety.

STATEMENT OF FEDERALLY FUNDED RESEARCH

Not applicable.

TECHNICAL FIELD OF THE INVENTION

The present invention relates in general to the field of device security and privacy. In particular, the present invention relates to devices and methods for protecting against side-channel attacks during device charging.

BACKGROUND OF THE INVENTION

Without limiting the scope of the invention, its background is described in connection with side-channel attacks of a device during power charging.

Mobile devices are increasingly relied upon in users' daily lives (e.g., entertainment [11], health and wellness [13, 24], or education [14]). Commonplace smartphone usage means that users increasingly can't wait until the end of the day to charge their device. In New York City for instance, a recent study indicates that users charge their phones almost three times each day on average [22]. This has led to the proliferation of mobile device charging hubs in public spaces and locations where individuals are particularly likely to be desperate to charge their devices (e.g., airports, malls, etc.).

Unfortunately, the public nature of these hubs make them vulnerable to tampering. By embedding illicit power meters in the charging stations an attacker could launch power side-channel attacks (alternately referred to as power analytics attacks) aimed at inferring user activity on smartphones using machine learning techniques. For example, in [26], it has been shown that power traces collected by a metering device embedded in such a hub could be used to infer the victim's web browsing habits with very high accuracy. FIG. 1 depicts a user working on a smartphone 100 while concurrently charging it from a USB hub 102 in accordance with the prior art. The person 104 owning the hub 102 (or a third-party entity having physical access to it) has instrumented the hub 102 to record power measurements while phones 100 are getting charged. At a later time after charging (or in real-time charging), the hub 102 sends power measurements 106 to the controlling entity 104 who then uses this data 106 to make inferences on the activities being undertaken by the victim on the phone 102.

The largest body of research on defenses against power side-channel attacks is perhaps in the cryptography domain. In this area, a wide range of techniques have been fronted to mitigate these attacks (e.g., see [2, 9, 16, 18]). The design philosophy behind many of these defenses typically leverages one, or some combination, of the following ideas: (1) leakage reduction (e.g., by making the cipher operations to be independent of the key), (2) noise introduction (e.g., injecting noise into power measurements), and, (3) incorporation of randomness (e.g., addition of randomness in the data input to the cipher system while still ensuring correctness of the results).

Outside of research on power side-channels in cryptography, the most closely related work is by Lifshits et al. [17]. In that work, it was shown that batteries having storage and processing capabilities (i.e., smart batteries) could be leveraged for power side-channel attacks on a smartphone user's activities. All that the attacker would have to do is replace a victim's phone battery with a malicious smart battery, collect power traces from the malicious smart battery, and use machine learning algorithms to make inferences on the victim's activities while using the phone. With respective accuracies of 65%, 36%, 100% and 86%, the authors were able to execute the following attacks via this side-channel: (1) inference of websites visited by the victim, (2) inference of key typed by the victim, (3) detection of incoming calls, (4) detection of camera usage.

A small section of their paper (about 3 quarters of a page—See Page 155 in their paper [17]) provided some highlights of how Dynamic Voltage and Frequency Scaling (DVFS), and what they referred to as a compute-heavy loop, succeeded at mitigating their attacks. Their best performing DVFS scheme (one that randomly selects DVFS states) was found to mitigate the website inference attack. The compute-heavy loop on the other hand was shown to mitigate the keystroke inference attack.

Accordingly, there is a need for devices and methods that protect against side-channel attacks during device charging.

SUMMARY OF THE INVENTION

Typically, three power side-channel attacks can be launched by an adversary during the phone charging process. Such attacks use machine learning to identify unique patterns hidden in the measured current draw and infer information about a user's activity. To defend against these attacks, two defense mechanisms, a hardware-based and software-based solution, are described herein. The defenses randomly perturb the current drawn during charging thereby masking the unique patterns of the user's activities. It is shown that the two defenses force each one of the attacks to perform no better than random guessing, thus acting as effective defense mechanisms against all such types of attacks. In practice, the user would only need to choose one of the defensive mechanisms to protect themselves against intrusions involving power draw analysis.

One embodiment of the present invention provides a circuit that protects a device from an attack while the device is charging. The circuit includes an input voltage connector, an output voltage connector coupled to the input voltage connector via a voltage bus, a variable resistance circuit connected between the voltage bus and a ground bus, and a processor coupled to the variable resistance circuit, wherein the processor randomly changes a resistance of the variable resistance circuit.

In one aspect, a memory is integrated into or communicably coupled to the processor. In another aspect, the variable resistance circuit comprises a set of resistive circuits, each resistive circuit comprising a resistive element connected in series with a switching element. In another aspect, the each resistive element has a different resistance value. In another aspect, the resistive elements comprise one 105 Ω resistor, two 24 Ω resistors, one 28 Ω resistor, one 30 Ω resistor, one 50 Ω resistor, one 100 Ω resistor, one 150 Ω resistor, one 200 Ω resistor, and one 250 Ω resistor; and each switching element comprises a MOSFET gate coupled to the processor. In another aspect, the processor includes a random number generator that generates a binary number and each bit of the binary number is used to turn on or off the switching element associated with the bit. In another aspect, the processor changes the resistance of the variable resistance circuit at a rate of 1 kHz. In another aspect, the circuit is integrated into a mobile communications device, a scrambler unit, or a power charging device.

Another embodiment of the present invention provides a method of protecting a device from an attack while the device is charging. The method includes: providing a circuit comprising an input voltage connector, an output voltage connector coupled to the input voltage connector via a voltage bus, a variable resistance circuit connected between the voltage bus and a ground bus, and a processor coupled to the variable resistance circuit, wherein the output voltage connector is coupled to a power supply of the device; connecting the input voltage connector to a power supply to charge the device; and protecting the device from attacks by randomly changing a resistance of the variable resistance circuit using the processor.

In one aspect, the circuit further comprises a memory integrated into or communicably coupled to the processor. In another aspect, the variable resistance circuit comprises a set of resistive circuits, each resistive circuit comprising a resistive element connected in series with a switching element. In another aspect, each resistive element has a different resistance value. In another aspect, the resistive elements comprise one 10 Ω resistor, two 24 Ω resistors, one 28 Ω resistor, one 30 Ω resistor, one 50 Ω resistor, one 100 Ω resistor, one 150 Ω resistor, one 200 Ω resistor, and one 250 Ω resistor; and each switching element comprises a MOSFET gate coupled to the processor. In another aspect, randomly changing the resistance of the variable resistance circuit comprises generating a binary number using a random number generator, wherein each bit of the binary number is used to turn on or off the switching element associated with the bit. In another aspect, the processor changes the resistance of the variable resistance circuit at a rate of 1 kHz. In another aspect, the circuit is integrated into a mobile communications device, a scrambler unit, or a power charging device.

Yet another embodiment of the present invention provides a method for protecting a device from an attack while the device is charging. The method includes: randomly generating an image having a height and a width; loading the generated image into a memory; rotating the generated image at a random angle; unloading the rotated image from the memory; and repeating the foregoing steps while the device is being charged.

In one aspect, the method further comprises determining the height and the width. In another aspect, the method further determines the random angle using a rotating matrix. In another aspect, the method further comprises: detecting the attack; and scaling the height and the width up or down depending on the attack. In another aspect, the method further comprises determining whether the device is being charged. In another aspect, the method is performed by a software application executed by a processor of the device. In another aspect, the method further comprises loading the software application on the device.

Yet another embodiment of the present invention provides a device that includes: one or more input/output interfaces; a memory; a power storage unit; and a processor communicably coupled to the one or more input/output devices, the memory, and the power storage unit, wherein the processor randomly generates an image having a height and a width, loads the generated image into the memory, rotates the generated image at a random angle, unloads the rotated image from the memory, and repeats the foregoing steps while the device is being charged.

In one aspect, the processor determines the height and the width. In another aspect, the processor determines the random angle using a rotating matrix. In another aspect, the processor detects the attack, and scales the height and the width up or down depending on the attack. In another aspect, the processor determines whether the power storage unit is being charged.

The foregoing is a summary and thus contains, by necessity, simplifications, generalizations, and omissions of detail. Consequently, those skilled in the art will appreciate that this summary is illustrative only and is not intended to be in any way limiting.

There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Figure 1:
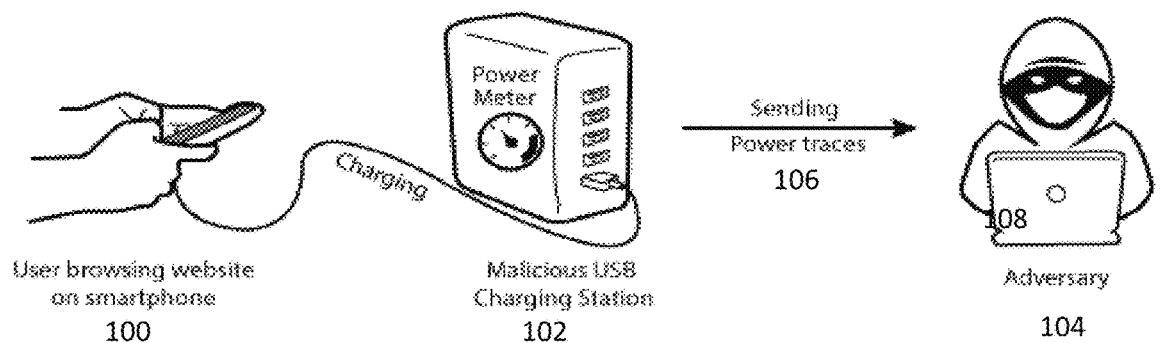
FIG. 1 depicts a user working on a smartphone while concurrently charging it from a USB hub in accordance with the prior art.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The following description is illustrates various non-limiting embodiments involving phones, but the present invention is applicable to any chargeable device that is susceptible to the attacks described herein.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Two schemes to mitigate this family of attacks are described herein. Specifically, two defense mechanisms are designed and rigorously evaluated—one hardware-based and the other software-based—both of which centered on perturbations in the current (or by extension, power) drawn during charging in order to mask identifying patterns of activities on the phone. For the hardware-based solution, a scrambler unit leverages a micro-controller to randomly switch load resistors on and off, creating a current draw that masks the true signal properties. For the software-based solution on the other hand, a background service that runs only during the charging process, imprints random patterns on the phone's CPU and memory resources in order to perturb the charger's current draw. For both solutions, the impacts on various flavors of the attacks were studied under different system parameter configurations, their impacts on charging time and how the software solution affects computing resources on the phone.

There are two significant differences between the inventions described herein and the work by Lifshits et al. [17], namely:

(1) Defense vs. Attack Objectives: The primary objective of the present inventions is defense. In particular, the following description is focused on the design, implementation and evaluation of two defense mechanisms against power side-channels on the phone charging process. In contrast, the primary objective of the work by Lifshits et al. [17] is offense.

Specifically, they introduce a new type of attack that exploits smart batteries, and rigorously evaluate its impacts. In less than a page, they give an overview of the performance of two potential software-based defenses, but do not delve into details of the design, implementation and evaluation of these defenses as this was not the core aim of their work.

(2) Differences in the Attacks Studied: An implementation and evaluation of three different attacks on the charging process are described herein to evaluate the defense schemes. These three attacks use the power side-channel to make inferences on variables similar to those inferred by the attacks by Lifshits et al. [17]. However, the attacks described herein differ in at least two ways from those in [17]. First, the attacks extract all their inputs from the charging hub and are centered on the power consumption dynamics as measured from a location between the phone and the hub. The attacks thus run only when a phone is being charged from the hub. In contrast, the attacks by Lifshits et al. [17] draw their inputs from the smart battery installed on the phone, and are thus centered on the power consumption dynamics as measured between the phone's battery and the phone's other hardware. The attacks by Lifshits et al. [17] hence do not depend on the charging process, and can run at anytime as long as the phone has the malicious battery installed. Second, the attacks in Lifshits et al. [17] were built based on a measuring device that sampled its inputs at a frequency of 1 kHZ, while the attacks described herein use data collected at a rate of 116 Hz.

By virtue of studying an adversary who measures power traces at a charging station, the work by Yang et al. [26] also has some commonality with the attacks described herein. In that work, the authors collected power traces corresponding to 50 different websites that were loaded on a smartphone, which was being charged from a USB charging station. Using a Random Forest classifier, the authors showed the websites loaded to be inferred from the power traces by up to 90% accuracy. The commonality between Yang et al. and the analysis described herein is that they studied one of the attacks (i.e., the website inference attack). A critical difference, however is that they did not study any defense mechanisms while the analysis herein is dedicated to the design and evaluation of defense mechanisms against the website inference attack and other attacks.

Another distantly related work is that by Yan et al. [25]. In that work, power traces captured from a smartphone were leveraged to identify the current mobile application running, the various user interfaces within a mobile app, password lengths and geographical locations of the users. However, Yan et al. differs from the analysis herein because their work does not design defenses, and builds attacks that require measurements on the phone itself (i.e., their attack has the highly restrictive assumption of an attacker installing malware on the victim's device).

In practice a user could choose either solution (hardware or software) described herein depending on their needs and preferences. While the hardware solution would add a (small) cost to the charger price due to the extra circuitry, it would not add any load to the phone's CPU and memory resources given its being external to the phone. On the other hand, while the software solution might in some cases add some (minimal) overhead to the CPU and memory, it would come at no added cost.

Design and evaluation of power side-channel attacks on phone charging: In order to evaluate the defense mechanisms, three power side-channel attacks were designed and implemented on the smartphone charging process. One of these, the website inference attack, is a recreation of the attack previously presented in [26]. Beyond this attack however, two side-channel attacks (i.e., the keystroke inference and call detection attack) are implemented and evaluated that have not previously been studied in regards to the smartphone charging process. While the recreation of the website inference attack confirms a known attack in a slightly different experimental setting, the other two attacks demonstrate that the charging side-channel could be a vehicle for a much wider range of attacks than currently studied by the security research community.

Hardware-based defense against power side-channel attacks on the smartphone charging process: A scrambler unit has been designed, built and evaluated that leverages a micro-controller to randomly switch load resistors on and off, creating a current draw that masks the true signal properties, consequently thwarting the attacks. The micro-controller selects the resistors to turn-on at random by using a 10-bit random number whose "1" bits indicate that the corresponding resistor is on while the "0" bits indicate that the corresponding resistor is off. The random number generation is itself based on a random seed obtained by reading a volatile RAM cell within the micro-controller's memory map right after reset. For different settings of the seed, the behavior of the array of attacks is studied, finding that all the attacks are reduced to random attacks when all 10 bits are used. In practice, the hardware defense is envisioned as an add-on to a conventional charger's circuitry, creating what is referred to as a defensive charger.

Software-based defense against power side-channel attacks on the smartphone charging process: A software-based mechanism against power side-channel attacks on the smartphone charging process has been designed, implemented and evaluated. The defense is implemented as a background service that runs only during the charging process, imprinting random patterns on the phone's CPU and memory resources in order to perturb the charger's current draw. The core of the service is centered on image manipulations which, for purposes of fine-grained control of the core defense mechanism, are carefully built to have certain components mapped to Android's Java SDK and others to the NDK (C++). For different configurations of the image manipulation process, the behavior of the array of attacks is studied, finding that all the attacks are reduced to random attacks for image sizes above 2000×2000 pixels. The impact of the defense on CPU, memory and charging time was studied, and it was found that on average it uses about 12% of the CPU, increases charging time by 4-11%, and uses less than 0.3% of the phone's memory.

Attack Details and Implementation

A threat model is described that expresses the capabilities and targets of the attacker. Details on the design and implementation of the three attacks built under the assumption of this threat model are then presented. These attacks will later serve as a basis for the evaluation of the proposed defense mechanisms.

Threat Model

The threat model assumes a victim undertaking activities on a smartphone which is plugged into a charging station. The charging station is under the control of an adversary who has instrumented it with power measurement capabilities. Examples of charging stations that might be under the control of an adversary include those in public places, such as airports, train stations, coffee shops (e.g., Starbucks), etc. As the user interacts with the phone while undertaking a series of activities, the charging station stores power measurement data which will then be used by the adversary to make inferences on the user's interactions with the phone.

Two primary forms of information that the attacker will be interested in include: (1) the identities of keys typed by the victim. The target in this case would include PINs, credit card numbers, passwords, etc., and, (2) the activities the user performs on the phone (e.g., which websites the victim browses to, which apps the victim launches, whether the victim uses the camera, etc.). To augment the attack, the adversary could leverage different kinds of additional contextual information. For example, because PIN entry is the first operation that users undertake every-time they retrieve their phone to unlock it, the attacker (e.g., a Starbucks employee) could observe the victim and determine the time blocks when such PIN entry happens. Such information would then be used to more accurately delimit the power measurement data to enhance the precision of the attack.

It is noteworthy that this attack does not require the adversary to install any sort of software on the victim's phone since all data used for the attack is collected externally at the charging station.

Implementation of the Attacks

All of the attacks were implemented using the following generic workflow: (1) data acquisition, (2) feature extraction, and lastly (3) classification. The data acquisition was done using a custom native Android apps that recorded power traces as the phones were charging. To ease implementation in the study, the last two steps were performed off-line on the collected data. Below, each of these steps is described in detail.

Data Acquisition

For each attack, a custom native Android application was used to capture the ground truth information as the user performed the desired associated activity (e.g., pressing keys, browsing websites, etc.). The ground truth information comprised of the activity label, and the start and end timestamps of that activity. All the activities were performed while the phone was charging. Power traces corresponding to each activity were collected using the power meter and stored in files for later processing.

Feature Extraction

Having collected the power traces for each attack, the collected data was split into 50% overlapping sliding windows of 2 seconds for the website inference and incoming call detection attacks. For the keystroke inference attack, the power traces were split based on the start and end timestamps of each key press. Thereafter, 14 features were extracted from each split-data segment. The features consisted of 9 temporal and 4 spectral features as shown in Table 1. Apart from the website inference attack, the extracted features from each data-split were directly used for classification.

TABLE 1

List of temporal and spectral features used

| Type | Feature |
|---|---|
| Temporal | Minimum, Maximum, Standard Deviation, Range, Interquartile Range, Energy, Signal Magnitude Area, Coefficient of Variation, Median, Number of Crossings |
| Spectral | Spectral RMS, Spectral Skewness, Spectral Centroid, Spectral Spread |

For website inference attack, during the preliminary experimentation, it was observed that the power traces collected while browsing the websites would spike (dramatically increase) at the start of website loading and then systematically or dramatically reduce till they stabilize when the website is fully loaded. Based on this observation, different time segments of the power traces produced characteristically unique signatures. The extracted features were, therefore, fused from the split-data windows of each captured web site instance into one feature vector before classification for the website inference attack.

Classification

During the classification phrase of the attacks, the performance of a variety of classification algorithms were evaluated in Python's machine learning framework, Scikit-learn [20]. In all the attacks, the Random Forest (RF) [3] and SVM [10] relatively outperformed the other classifiers. A combination of these two classifiers into an ensemble didn't yield much better performance. For consistency during the attack and defense evaluations, only the average performance from these two classifiers were reported. The parameters of the Random Forest were set to n_estimators=1000 while the SVM parameters were set to kernel="rbf", C=1000 and gamma="auto".

Proposed Defense Mechanisms

The designs for the hardware and software-based defense mechanisms will now be described.

Hardware-Based Defense

The hardware-based defense (also alternately referred to as a scrambler) includes two main components, namely: (1) a hardware component and (2) a firmware (software) component. The hardware component uses a number of resistors to alter the current drawn by a charging mobile device as seen by an adversary. The software component is firmware that executes within a micro-controller inside of the hardware component. This software is responsible of controlling the hardware's operations.

Scrambler System Hardware

Figure 2:
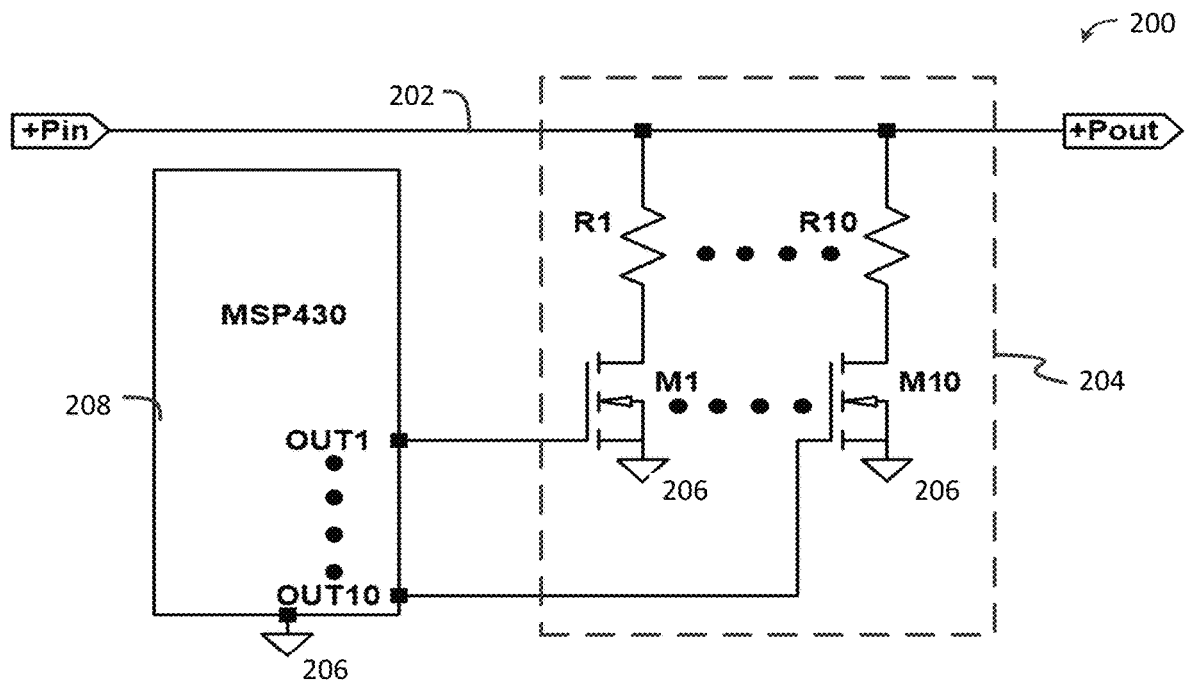
FIG. 2 shows a block diagram of a hardware-based scrambler component in accordance with one embodiment of the present invention.

FIG. 2 shows a block diagram of a hardware-based scrambler component 200 in accordance with one embodiment of the present invention. The hardware-based scrambler component 200 employs a number of devices to alter the amount of current that the mobile device draws as seen by the charger. The scrambler 200 includes an input voltage connector (+Pin), an output voltage connector (+Pout) coupled to the input voltage connector (+Pin) via a voltage bus 202, a variable resistance circuit 204 connected between the voltage bus 202 and a ground bus 206, and a processor 208 coupled to the variable resistance circuit 204. The processor 208 randomly changes a resistance of the variable resistance circuit 204. The variable resistance circuit 204 includes a set of resistive circuits (e.g., 1 to 10), each resistive circuit comprising a resistive element (e.g., R1 to R10) connected in series with a switching element (e.g., M1 to M10).

Figure 3:
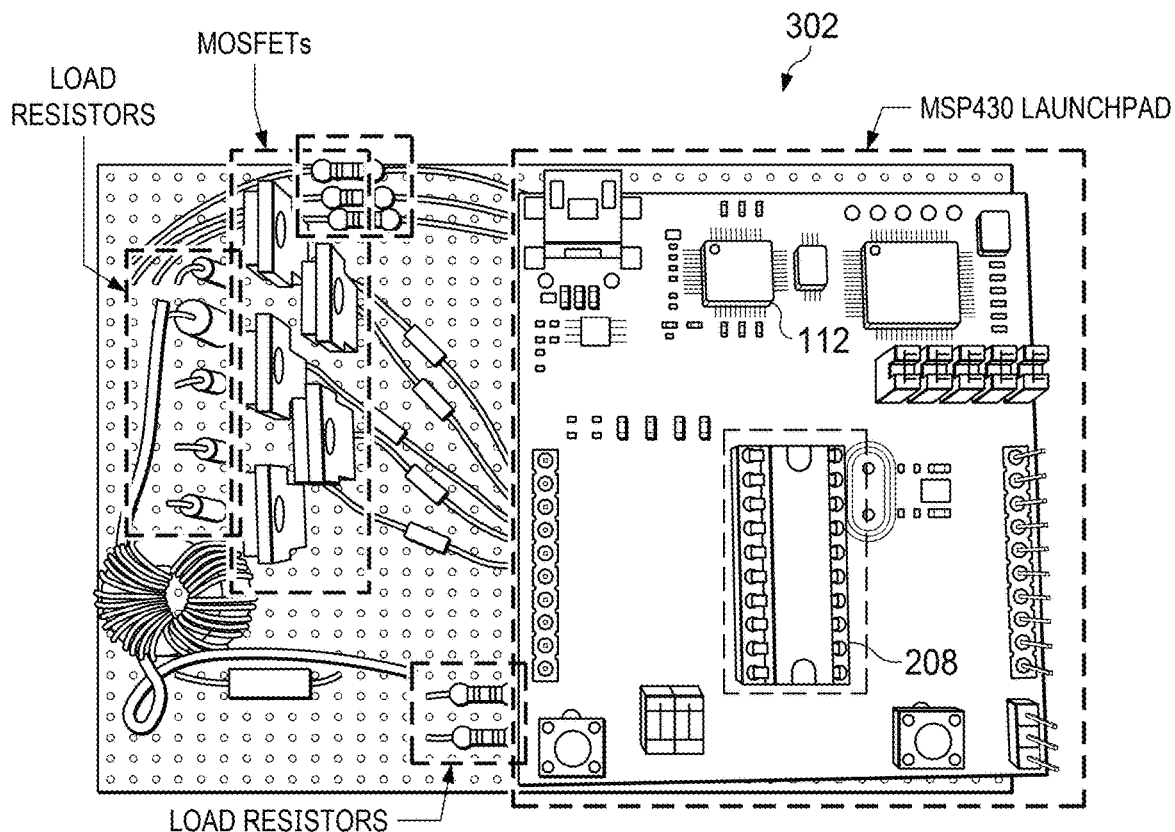
FIG. 3 is an image of a hardware based scrambler circuit in accordance with one embodiment of the present invention.

In this embodiment, the scrambler 200 has ten load resistors (R1 to R10), ten metal-oxide-semiconductor field effect transistors (MOSFETs) (M1 to M10), and a small MSP430 micro-controller 208 which sits on top of an MSP430 Launchpad 302 developed by Texas Instruments (see FIG. 3). Other embodiments may include more or less than 10 resistive circuits.

The ten load resistors (R1 to R10) are used to provide an additional load to the charger by drawing an amount of current (I) determined by Ohm's law in Equation 1, using the charging voltage Vch, and the load resistors' values (R). The resistance values used in this circuit for the load resistors are: one 10 Ω resistor, two 24 Ω resistors, one 28 Ω resistor, one 30 Ω resistor, one 50 Ω resistor, one 100 Ω resistor, one 150 Ω resistor, one 200 Ω resistor, and one 250 Ω resistor. Using this resistor selection, the hardware-based scrambler is capable of drawing currents from 0 mA to 1488 mA. Other embodiment may use different resistance values. No digital circuitry is capable of sourcing or sinking large amount of currents. For this reason, MOSFETs are used to provide current switching capabilities beyond what the micro-controller can handle.

$$I = \frac{V_{ch}}{R} \tag{1}$$

Scrambler System Firmware

The MSP430 micro-controller 208 is an integrated circuit that contains a central processing unit (CPU), flash memory, and volatile random access memory (RAM). The micro-controller 208 is programmed with software written in the C programming language that determines when and which resistors are switched in to draw current with the help of the on-board MOSFETs. The MSP430 micro-controller 208 is able to switch a resistor into the circuit by setting an output pin "high" which produces a voltage on a MOSFET gate to turn-on the switch. The micro-controller 208 selects the resistors to turn-on at random by using a random 8-bit seed obtained by reading a volatile RAM cell within the micro-controller's memory map right after reset. After the srand( ) function has been seeded, the rand function is used to generate a random 10-bit number at a rate of 1 kHz in which each one of the bits represent the state of a load resistor. A logic level of "1" signifies that the corresponding resistor is on, while a logic level "0" signifies that the corresponding resistor is not used to provide a load. Using this scheme, the load resistors are continuously switched into and out of the circuit at random, creating a random current draw, which effectively masks sensitive data.

Software-Based Defense

The key design requirements of the software defense mechanism will now be described, before presenting the design and its implementation.

Design and Implementation Requirements

In addition to the core requirement of having to be effective at its primary aim of mitigating power side-channel attacks, the software solution—given its being run on the phone—needs to be carefully designed to not overrun the phone's resources. Some the design requirements are described below that were taken into consideration during the design and implementation of the solution.

Security-Performance Trade-off: The main idea behind the defense mechanism is to inject random bursts into the power drawn from the USB hub, in such a way to distort the smartphone user activity patterns embedded in the power traces. In distorting the activity patterns however, the bursts should not be so strong as to hog the smart-phone's resources (in terms of CPU, memory, etc.), yet should be enough to fully distort the patterns exploited by the attacks.

Precision and Fine Control: Given an attacker who already has the relevant trained machine learning model, the amount of data required to make an inference on a private attribute (i.e., testing stage) can be on time-scales of between milliseconds (e.g., key intervals) to a couple of seconds (e.g., website load times). This calls for high precision and (or) fine-grained control of the defense operations. For example, once the defense is initiated, it should be able to start almost instantly. If it takes a few seconds to fully kick in, certain attacks might already have gotten enough clean data. Even after being started, the bursts produced by the mechanism need to impact the power time series at very fine-grained time scales.

Transparency to the user: As long as it is enabled by the user, the defense needs to be designed in such a way that it is automatically triggered at the start of charging so as to offer protection immediately, and to be deactivated immediately charging stops (so as not to waste resources).

Choice of Defense Operations

A central element of the design is the identification of an operation that is able to cause significant distortions in the phone's power draw from the charger, and to configure this operation such that it performs the intended function while not consuming much of the phone's resources. Given that past research has shown power consumption in smartphones to be dominated by the CPU usage, memory usage, network connectivity, screen display and sensor usage [6, 7], an operation causing significant power bursts needs to draw from some or all of these components.

For the application scenario, screen display would be out of the question as the solution needs to run in the background. Network connectivity is not viable because it would require a secondary device to connect to, and might have cost implications. The other three were toyed with and preliminary experiments were conducted on a series of operations including, the RSA challenge [8], computation of 7C, bit reversal, factorials of large numbers, Math.tan( ) calculations, and running and reading data from the sensor API. It was found that most of these didn't yield noticeable power bursts in the traces collected, likely because they were predominantly CPU-intensive, and did not use much memory.

Image (Bitmap) manipulation operations were finally zeroed in on, which are computations known to be both CPU and memory intensive in Android [5]. The image manipulations gave us an ability to configure the defense to different levels of impact (e.g., by changing image dimensions), and had elements of both CPU (i.e., computations on the image) and memory load (i.e., writing images to memory).

Defense Design and Implementation

The defense was implemented as an Android background service that randomly generates an image of specified height and width whenever the smartphone is plugged into a power source. The service then loads the generated image into a memory, rotates the image at random angles using the rotation matrix given in Equation 2 and then immediately unloads the image from memory. These three operations are performed in sequence and continuously by the service.

$$R = \begin{bmatrix} \cos\theta & -\sin\theta \\ \sin\theta & \cos\theta \end{bmatrix} \quad (2)$$

The Android service was designed to automatically run only when the smartphone is charging. For this functionality, a BroadcastReceiver was implemented that receives the ACTION_POWER_CONNECTED and ACTION_POWER_DISCONNECTED broadcast intents whenever the phone has been connected and disconnected from the power supply respectively.

---
ALGORITHM 1: Software-Based Defense Implementation
---

```
   Input: height, width
 1   // height: Image height in pixels
 2   // width: Image width in pixels
 3
 4   while phoneIsCharging do
 5   |      // Generate random image
 6   |      image ← generateImage(height, width)
 7   |
 8   |      while true do
 9   |      |      // Rotate image by random angle, get
         |      |         pixels
10   |      |      randDegrees = Random(-360, 360)
11   |      |      rotatedPixels[ ] ←
         |      |         rotateAndGetPixels(image, angle)
12   |      |      // Free up memory
13   |      |      delete[ ] rotatedPixels
14   |      |      if phoneNotCharging then
15   |      |      |      break
16   |      break
```

Algorithm 1 provides the implementation details of the service. The algorithm inputs the height (in pixels) and the width (in pixels) of the random image to be generated. The algorithm uses three functions: (1) generateImage( ) to generate a random image with the specified height and width, (2) Random( ) to generate a uniformly distributed random value within a specified range, and (3) rotateAndGetPixels( ) to rotate the image and extract the pixel (rgb) values of that image. While the smartphone is charging, Line #6 generates a random image with the specified input dimensions and then continuously rotates the image by a randomly generated angle (Lines #8-#12). Line #12 rotates the image and temporarily stores the pixel values of the randomly generated image into an array resulting into memory read/write operations. The computations in the algorithm lead to increased CPU usage while the memory read/write operations lead to increased memory usage. Line #15 finally deletes the pixel values of the rotated image freeing up the memory leading to reduced memory usage. In the sensitivity experiments, it was found that image sizes of 2000×2000 pixels were able to completely thwart the attacks. In practice however one could scale these numbers up or down depending on the attack in question and the required privacy-performance balance.

Figure 4:
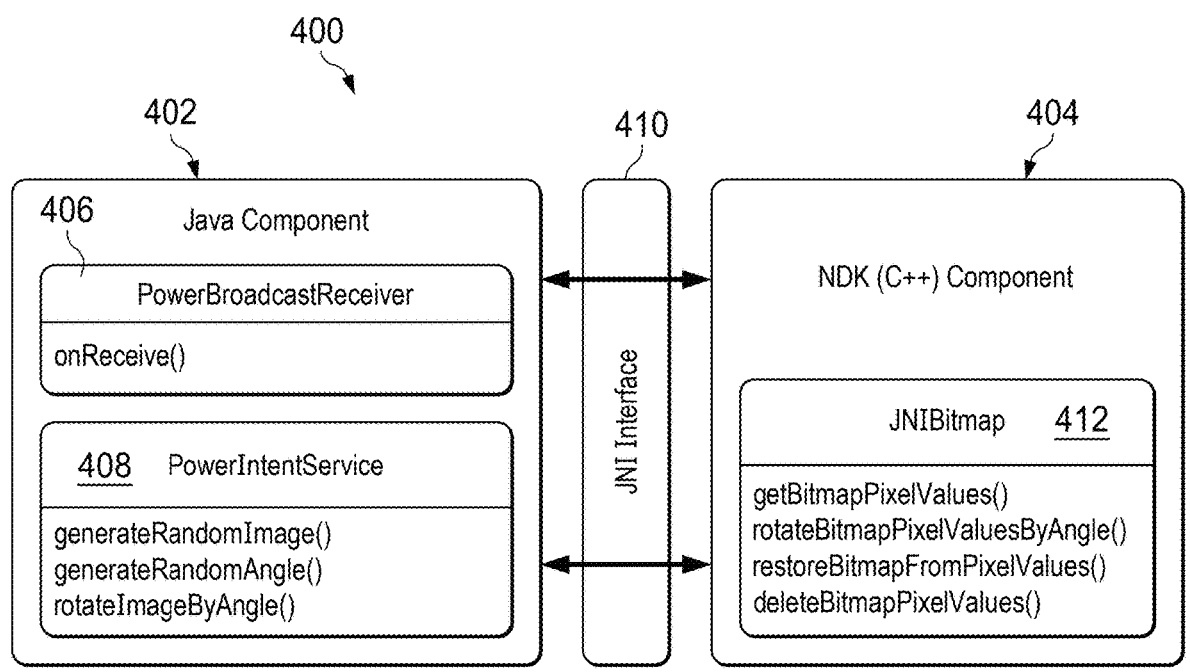
FIG. 4 illustrates the different components of the software defense solution in accordance with one embodiment of the present invention.

FIG. 4 illustrates the different components of the software defense solution 400 in accordance with one embodiment of the present invention. The Android service was decomposed into two main components: (1) an Android Java component 402 and (2) a Native Development Kit (NDK) component 404. This figure shows the main classes and methods embedded in the two main components of the software defense solution. The Android Java component 402 consists of mainly a BroadcastReceiver 406 and a background service IntentService 408. The BroadcastReceiver 406 responds to broadcast intents received when the phone is connected or disconnected from power. When the smartphone is connected, it starts the background service IntentService 408 that randomly generates an image of the specified dimension. The background service IntentService 408 then constantly generates a random angle and invokes the NDK (C++) component via the JNI Interface 410 to rotate the image at the specified random angle.

The NDK (C++) component 404 consists of a JNIBitmap service 412 that performs the actual rotation of the image using low-level rotation matrix computations as described in Algorithm 1 above. Although Android Java could be used to implement the rotation, it wasn't used because constantly loading, rotating and unloading the image caused continuously allocation and deallocation of memory leading to GC_FOR_ALLOC events. These GC_FOR_ALLOC events cause application freezing and unresponsiveness. To prevent these GC_FOR_ALLOC events, this component was implemented using NDK (C++) using Java Native Interface (JNI) framework. NDK significantly increased the performance of the computation and gave more granular control over garbage collection to free memory instantly.

Experimental Design and Setup

Details on the kind of experiments that were conducted will now be described, the setup of the experiments, data collection process, feature engineering and the classification pipeline used in the attacks.

Data Collection Experiments

For each of the website inference, keystroke inference, and, incoming call detection attacks, three data collection experiments were conducted. One experiment was used to collect data that was used to illustrate the attack (i.e., power signals were captured without perturbations by the defense), while the other two were used to collect data that was used to illustrate the two defense mechanisms (i.e., the defense mechanisms were run to perturb the data being collected). A general description of the three experiments is given below.

Attack Experiment: The first experiment consisted of connecting the smartphone(s) to the power meter via USB and collecting power traces tailored to the specific activity (web browsing, key tapping, or phone call) while the phone was charging. The data from this experiment was used as a benchmark for the later evaluation of the defense solutions.

Figure 5:
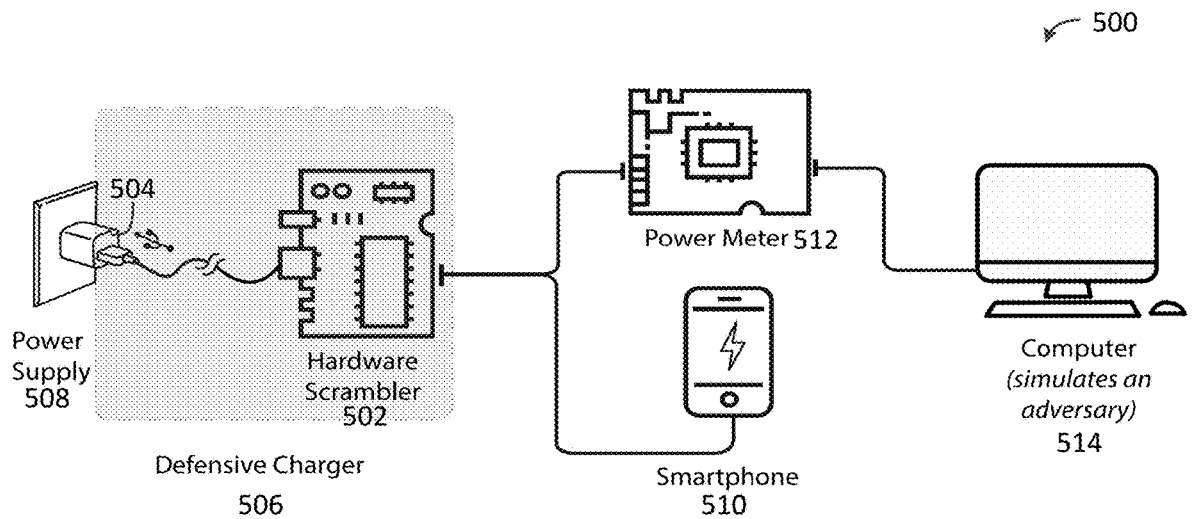
FIG. 5 depicts a setup for the hardware defense experiment in accordance with one embodiment of the present invention.

Hardware-Based Defense Experiment: In the second experiment, the hardware defense solution (scrambler) previously described was used. This experimental setup 500 in accordance with one embodiment of the present invention is shown in FIG. 5 and reflects the real-world scenario where the hardware defense solution is used to defend against the website inference attack. Note that in practice, the hardware scrambler 502 would be inbuilt into the USB wall plug adapter 504 to form the hardware defense solution (shown as defensive charger 506). The USB wall plug adapter 504 is plugged into the power supply 508. Instead of connecting the phone 510 directly to the power meter 512, the phone 510 was connected to the power meter 512 via the defense scrambler 502. The power meter 512 is connected to the computer 514, which simulate an adversary.

Software-Based Defense Experiment: In the third experiment, the software defense solution previously described was used. The setup of this experiment is similar to that in Experiment (1) above, except that the phone in this case had the software defense solution running during data collection.

Data Collection Tools

Here, the meter making the power measurements, and the smartphones and software used in all the experiments are described. Because the data collection procedures differ from one attack to another, the evaluation results for each attack are discussed below.

Power Trace Collecting Equipment

To emulate the malicious USB power charging station, a simple power meter was built using an MSP430 microcontroller similar to the one used in the hardware scrambler circuit (see FIG. 3). One end of the power meter was connected to the smartphone via a USB port while the other two ends were connected to a power supply and a computer. While the phone is charging, the power meter measures the amount of current (in amps) being drawn from the power supply. The measured amps (at a sampling rate of 116 Hz) are then output to a connected PC for storage into files for the offline analysis. Note that the number of amps gives an indirect measure of power, given the constant voltage (5V). A Python script was used to read and save the power readings from the serial port of the computer that was connected to the power meter.

Smartphones and Software Used

The Samsung Galaxy S5 and Samsung Galaxy S6, both running Android OS, Version 6.0.1 (Marshmallow), were used to collect power traces in all the experiments. The smartphones had all the default Android applications and background services running as well as an active WiFi-internet connection. Having all these applications running was meant to make the experiments closely reflect a real-world setting. The StayAlive app [21] was installed on each smartphone to prevent the phone from locking and to keep the screen on, without dimming. During a particular attack experiment, the custom Android app (e.g., the keypad for keystroke inference) was installed and/or run in order to capture the relevant data.

Note that although Samsung phones running Android OS were used, the various embodiments and teachings disclosed herein are applicable to other types of phones and operating systems, and any other type of device that is susceptible to such attacks.

Attack and Defense Evaluations

The evaluation results organized by attack will now be described. For each attack, the data collection procedure used is described and then the performance of the attack without the use of any defense mechanism is presented. To generate the performance numbers, both training and testing are done using unperturbed power measurement data (i.e., data that is free from any distortion by any defense mechanism). These performance numbers are referred to as the baseline performance of the attack and these numbers are later used as a benchmark to evaluate the impact of the defense mechanisms on the attack. After presentation of the baseline performance, the two defense mechanisms are evaluated under the following scenarios:

Attack vs Defense Scenario: This scenario covers the case of a naive attacker who is unaware of any defenses that could be used against the attack. The attacker in this case trains his/her classifiers using unperturbed power traces. Testing is however done based on data collected when the (hardware or software) defense is used. In other words, the attacker's malicious meter captures noisy data (that the attacker uses for testing) because the victim deployed the charging defense without the attacker's knowledge. This is the conventional scenario for measuring the impact of defense mechanisms against Machine Learning-centric attacks.

Defense vs Defense Scenario: In this scenario, it is assumed that a savvy attacker anticipates that the victim uses a defense mechanism, and thus trains the attack algorithms using data that has been subjected to the perturbations.

Owing to space limitations, for all attacks except the website inference attack, results are only reported when all 10 bits are used in the hardware-based defense (recall the 10-bit random number used to switch in different combinations of resistors) and when the largest (2000×2000 pixels) image is used in the software-based defense. For the experiments, these results are adequate to demonstrate the performance and behavior of the defense as they cause the attack to have near random guessing performance under each of the defense mechanisms. In practice however, the circuit could be easily modified to support a higher number of bits and resistor combinations, while image sizes could be increased to provide stronger defenses as needed.

Website Inference Attack

The performance of the website inference attack is evaluated using power traces collected while loading homepages of the 50 most popular websites (as ranked by Alexa [23] in June 2017). Websites with adult content were excluded and only one URL was used for websites that appeared more than once. A native Android app with a background service was used to launch the different websites, one after another, in a web browser. The websites were launched in the Chrome browser (with default settings). Each website is loaded for only 15 seconds before the service loads another website.

The data is collected in two sessions, capturing 30 power traces of each of the 50 websites in each of the sessions. In total, 30×50=150 power traces were collected in each session. Each power trace corresponded to power readings of 15 seconds while loading the homepage of a particular website. Two data sessions on two separate days were done for each of the experiment. Unless stated otherwise, for each experiment, the power traces collected from the first session were used for training while the power traces from the second session were used for testing.

TABLE 2

Baseline performance of the website inference attack over 10 train-test iterations.

| Classifier | First | Third | Fifth |
|---|---|---|---|
| Random Forest | 71.45 | 80.52 | 87.35 |
| SVM | 66.15 | 78.42 | 83.68 |

Baseline Evaluation of the Website Inference Attack

Table 2 shows the baseline performance of the website inference attack. The average F-scores of the Random Forest and SVM classifiers attained over 10 train-test iterations are reported. The first, third and fifth guessing attempts were considered. On average, the Random Forest classifier achieved an F-score of 71.45% for the first attempt and up to 87.35% for the fifth attempt. The SVM classifier on the other hand achieves slightly lower F-scores of 66.15% and 83.68% for the first and fifth attempt respectively. The results in Table 2 show that an adversary using this attack achieves a higher website identification accuracy compared to 2% (when the adversary uses random guessing). Because these results do not differ much from the state-of-the-art (see [26]), there is confidence that the attack is replicated correctly, and thus will provided a good basis to evaluate the defenses. Due to space limitations, the details of the various variables affecting the attack (e.g., the variety and number of websites, the amount of data per website) are not delved into. Please refer to [19, 26] for such analysis. Having established a baseline for this attack, the evaluation of the defense schemes is presented next.

Hardware Defense Evaluation Against Website Inference Attack

Figure 6A:
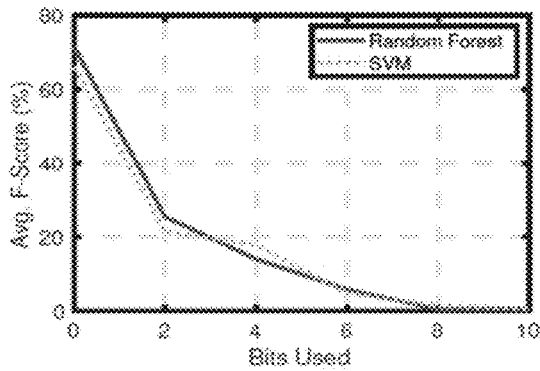
FIGS. 6A and 6B show the hardware defense performance for different number of bits used in accordance with one embodiment of the present invention.

Attack vs Defense Scenario: FIG. 6A shows the performance of the attack in the earlier described scenario where the attacker is unaware of the deployment of the hardware defense mechanism. For both classifiers, the attack's baseline performance rapidly drops (from an F-score of around 70% to just over 20%) when 2 bits are used in the hardware scrambler and then drops more gently as more bits are added. The attack performance reaches random guessing at about 8 bits. At 8-bits, the system has $2^8$ different possible combinations of resistors switched in and out at 1 kHz to morph the current draw. It is noteworthy that just this number of bits is enough to break the attack under this conventional defensive configuration.

Figure 6B:
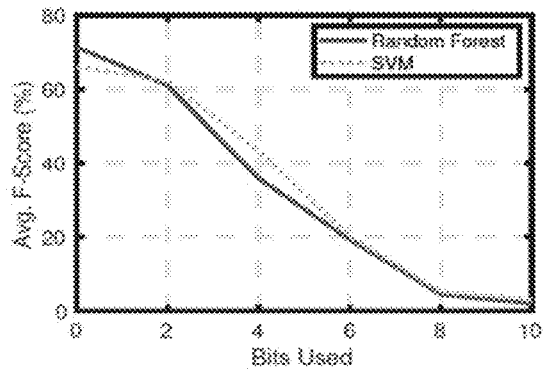

Defense vs Defense Scenario: FIG. 6B shows the performance of the attack in the scenario where the attacker anticipates that the victim deploys the hardware defense, and hence includes defensive data in the attack design. The figure demonstrates a less drastic drop in F-score (relative to FIG. 6a) but also approaches random guessing in the 8 to 10-bit range. This gentle drop relative to the previous figure is likely because, at low numbers of bits, there is a small number of possible resistor combinations which are repeated many times per second. This implies that the patterns of current perturbation represented in different instances of defense data for a given website do not differ much from each other, resulting in training sets that are very similar to the test sets (and hence high F-scores). At around 8 to 10 bits however, the higher numbers of combinations begin to make the train and test sets dissimilar.

Software Defense Evaluation Against Website Inference Attack

Figure 7A:
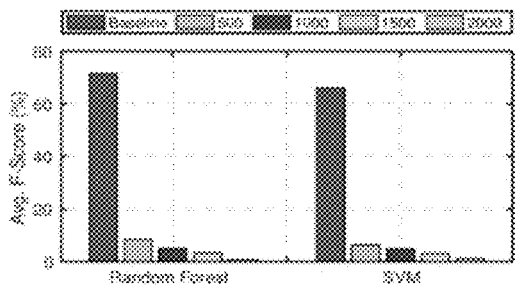
FIGS. 7A and 7B show the overall performance of the attack in the presence of the proposed software defense mechanism in accordance with one embodiment of the present invention.

Attack vs Defense Scenario: FIG. 7A shows the performance of the attack in the scenario where the attacker is unaware of the software defense mechanism. The attack's performance rapidly drops (from over 65%) to less than 8% (close to random guess) for both classifiers implying that the defense solution is highly effective for all image sizes (i.e., the images significantly morph the current draw, such that the train (or unperturbed) data is drastically different from the test (or perturbed) data even when the images are relatively small).

Figure 7B:
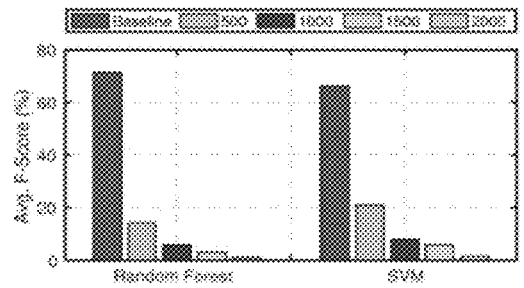

Defense vs Defense Scenario: FIG. 7B reveals the performance of the attack in the scenario where the attacker is aware of the software defense mechanism. The SVM achieves about 20% when the smallest (500×500 px) image is used while the Random Forest achieves about 15% when the same sized image is used. These numbers drop to under 5% when the largest image is used. Overall, the reduction in F-score in this scenario is slightly lower than the reduction seen under the Attack vs Defense scenario. However, it is apparent that the reduction is significant. These results point to the potency of the software solution under this attack.

Keystroke Inference Attack

The keystroke inference attack is evaluated based on power traces collected while users pressed keys on a number pad containing 12 keys. The number pad is similar to the inbuilt Android PIN lock and contains numbers 0 through 9, '*', and '#'. During data collection, each user held the smartphone in portrait format using the left hand and pressed any key using their index finger of the right hand in any random order. Power traces corresponding to 2,400 key presses over 2 separated sessions were collected. Each key was pressed 200 times for both sessions, 140 times for the first session and 60 times for the second session. The data collected in the first session was used for training while that collected in the second session was used for testing.

TABLE 3

Baseline performance of the keystroke inference attack over 10 train-test iterations.

| Classifier | First | Third | Fifth |
|---|---|---|---|
| Random Forest | 26.64 | 58.60 | 76.34 |
| SVM | 24.51 | 56.18 | 75.05 |

Baseline Performance of the Keystroke Inference Attack

Table 3 shows the baseline performance of the keystroke inference attack. The results are expressed in terms of average F-scores of the Random Forest and SVM classifiers. The results attained over 10 iterations of classification training and testing. In the first attempt, the Random Forest attained an average F-score of about 26% while the SVM attained a slightly lower average F-score of about 24.51%. These F-scores are about 3 times more than the random guess accuracy of about 8%, implying that this attack, would be of much vale to the adversary.

Hardware Defense Evaluation Against Keystroke Inference Attack

Table 4 shows the performance of the keystroke inference attack under the hardware defense mechanism when 8 bits are used.

TABLE 4

Average performance of the keystroke inference attack when 10 bits are used in the scrambler.

| Classifier | Attack vs Defense | Defense vs Defense |
|---|---|---|
| Random Forest | 6.04 (1.24) | 8.04 (0.06) |
| SVM | 7.02 (0.58) | 7.04 (0.43) |

From Table 3 and Table 4, it was observed that the attack's performance drops from an F-score of over 24% to around random guess (approx. 8%). The Random Forest attains the worst performance of 6.04% in the Attack vs Defense scenario and the worst performance of 7.08% in the Defense vs Defense scenario is attained by the SVM. For both scenarios, this performance is worse than random guessing. These results reveal that the scrambler is very effective against the keystroke inference attack in both training scenarios.

TABLE 5

Average performance of the keystroke inference attack when the image dimension parameters are set to 2000 × 2000 px in the software-based defense.

| Classifier | Attack vs Defense | Defense vs Defense |
|---|---|---|
| Random Forest | 6.04 (1.24) | 8.04 (0.06) |
| SVM | 7.02 (0.58) | 7.04 (0.43) |

Software Defense Evaluation Against Keystroke Inference Attack

Table 5 shows the performance of the keystroke inference attack under the software mechanism (the largest image used). A trend similar to that seen under the hardware defense was observed. The Random Forest attains the worst performance of 8.33% in the Attack vs Defense scenario while the SVM attains the worst performance of 8.53% in the Defense vs Defense scenario. Overall, both classifiers get degraded to random guessing when the largest image is used.

Incoming Call Detection Attack

The incoming call detection attack was evaluated based on power traces collected when the phone was idle and when it was ringing. Two different ringtones were used when collecting training data and a third ring tone (different from those in training) was used when collecting testing data. The traces were collected in two sessions. In each session, 20 traces were collected for idle and 20 traces were collected for each ring tone.

Baseline Performance of the Incoming Call Detection Attack

Figure 8:
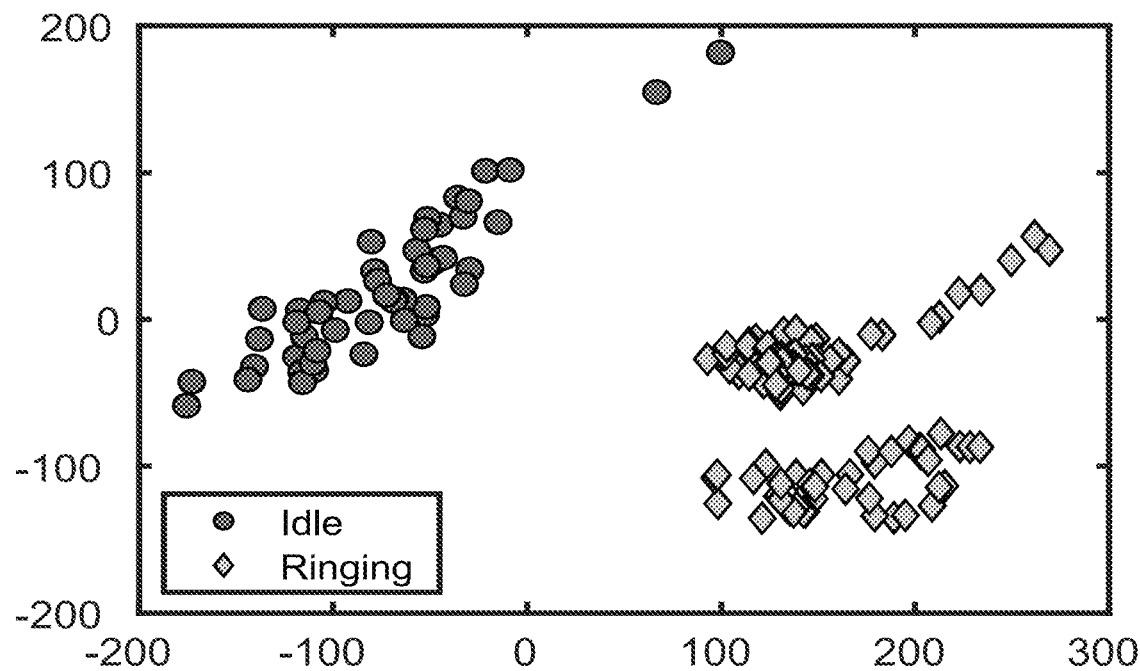
FIG. 8 shows the visualization of two dimensions obtained after performing PCA on 150 randomly selected feature vectors (50 for idle and 100 for two different ringtones) in accordance with one embodiment of the present invention.

An average F-score of 99.35% was attained for the SVM and 99.93% for the Random Forest for the incoming call detection attack when none of the defense mechanisms were used. In FIG. 8, a PCA transformation of 150 randomly selected feature vectors in two dimensions is visualized. As observed in the figure, there is a clear distinction between idle and ringing thus explaining the high accuracy attained.

TABLE 6

Average performance of the incoming call detection attack when 10 bits are used in the scrambler.

| Classifier | Attack vs Defense | Defense vs Defense |
|---|---|---|
| Random Forest | 50.02 (0.08) | 51.2 (0.43) |
| SVM | 49.64 (0.04) | 50.8 (1.92) |

Hardware Defense Evaluation Against Incoming Call Detection Attack

The evaluation results of the hardware-based defense against the incoming call detection attack are shown in Table 6. Based on the attack's baseline results presented above, the attack's performance drops from 98% and 99% to about random guess (50%). The worst performance of 49.64% is attained in the Attack vs Defense scenario. It was also observed that the SVM attains the worst performance in both scenarios. These results indicate that the hardware-based defense is effective at mitigating the incoming call detection attack.

TABLE 7

Average performance of the incoming call detection attack when the image dimension parameters are set to 2000 × 2000 px in the software-based defense.

| Classifier | Attack vs Defense | Defense vs Defense |
|---|---|---|
| Random Forest | 47.28 (0.24) | 49.75 (0.25) |
| SVM | 46.56 (0.37) | 50.00 (0.03) |

Software Defense Evaluation Against Incoming Call Detection Attack

In Table 7, the average performance of the incoming call detection attack under the software-based defense is shown. Again, the attack performance drops by about 50% relative to the baseline performance, attaining average F-scores hovering around the 50% mark for both the Attack vs Defense and Defense vs Defense scenarios.

Like was seen in earlier cases, these results point to the software defense's ability to convert the attacks studied here into random attacks.

Efficiency of the Defense Mechanisms

The efficiency of the defense mechanisms will now be evaluated based on charging times and the resources (in terms of CPU and memory) used on the phone. The overall energy expenditure if the technology were to be used at scale was approximated and shown that it is unlikely to add significant energy use (and carbon emissions) overall.

Impact on Charging Times

To evaluate the impact on charging times, the charging times of the phone were compared with and without the defense mechanism. The phones were first charged without either defense mechanism and the charging time was tracked. These baseline charging times are then used to calculate the increase in charging time for both defense mechanisms. For each defense mechanism, the phone was charged from 0% to 100% and then discharged it back to 0%. This charging and discharging process was repeated 10 times for each phone.

Figure 9:
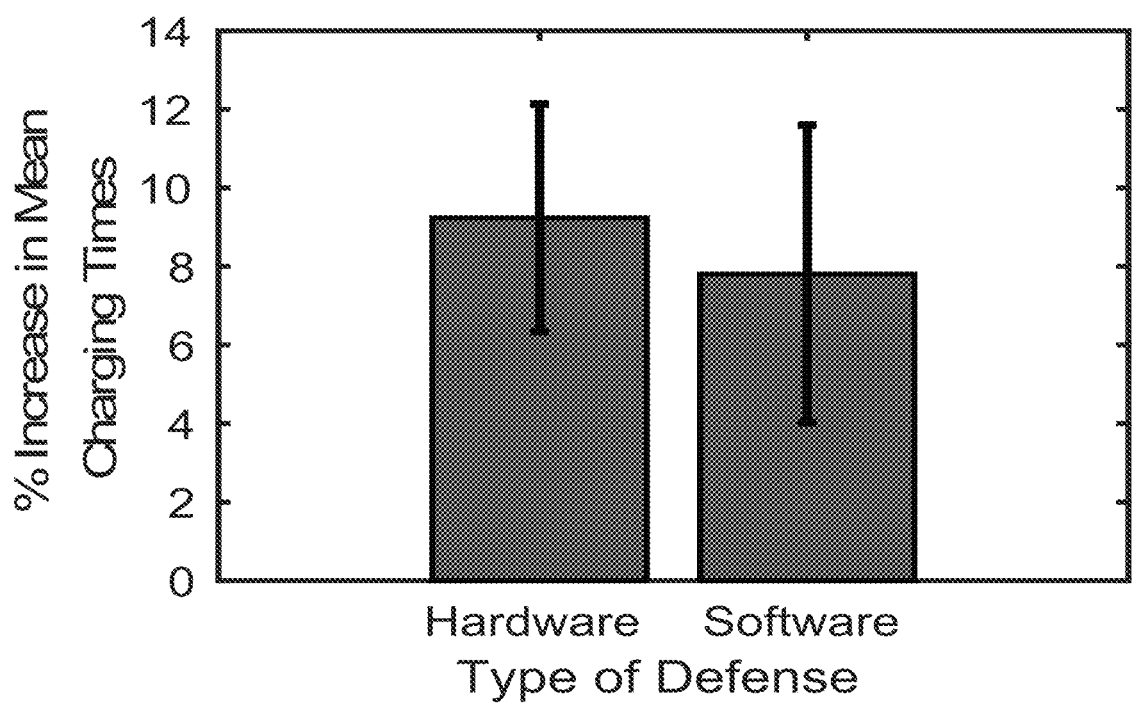
FIG. 9 shows the impact of the defenses on the charging times in accordance with one embodiment of the present invention.

FIG. 9 shows the impact of the defense mechanisms on the smartphone's charging time. The y-axis captures the percentage increase in charging time when the defense mechanism is used. The increase is computed from the difference between the charging time when the defense is deployed and the charging time when no defense is used. From the figure it is observed than an increase in charging time due to the hardware-based defense is approximately 6-12%, while the software-based defense ranges from 4-11%. It aligns with the inventor's intuition that both defense mechanisms would produce an increase in the charging time. The average percentage increase for the software defense is also lower than the hardware approach (approximately 7.5% compared to 9%). This experiment thus suggests that the software defense, while on average providing a lower increase in charging time, is less consistent in its impact on charging time.

Since both defenses are only deployed during the charging process, the defense mechanisms have no effect on the discharging process and normal usage of the phone when not charging it. Additionally, the defenses could be further targeted to scenarios in which the user is in unsafe environments (e.g., airports) or they are performing private operations. This targeted approach to defense helps mitigate defense-performance trade-offs for users.

Impact on CPU and Memory Utilization

In practice, the hardware-based defense would be incorporated into the charging adapter itself and therefore wouldn't impact any resource utilization on the phone. On the other hand, the software-based defense would be installed on the user's phone and therefore uses some resources on the user's phone for the sole purpose of defending against the attacks. The CPU and memory utilization of the software-based defense is, therefore, evaluated.

For this experiment, the CPU and memory utilization of the software-based defense are evaluated while the phone is charging. The phones used in this experiment have a Wi-Fi internet connection with the default pre-installed Android apps and services. The defense was used when the image dimension is set to 2000×2000 px (the largest dimension used in the study) as this gives the worst charging times attained in the experiments. To measure the resource utilization of each application and service running on the phone, a custom script was used that ran the cpuinfo and meminfo commands of the adb shell dumpsys tool every one (1) minute for an hour.

Figure 10A:
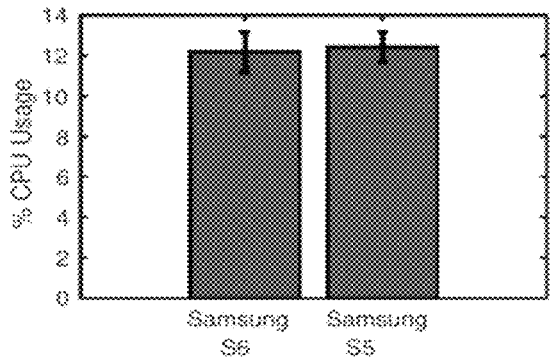
FIGS. 10A and 10B depict the percentage utilization of the CPU and memory of the software defense in accordance with one embodiment of the present invention.
Figure 10B:
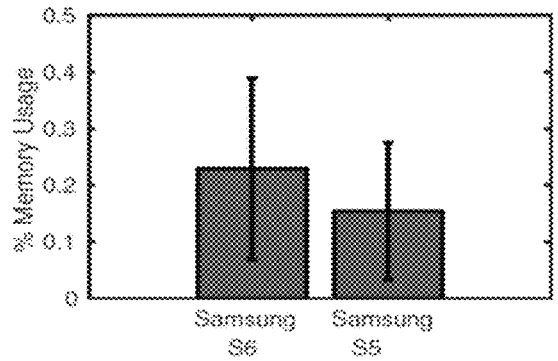

FIGS. 10A and 10B shows the CPU and memory utilization of the software-based defense when deployed on a charging smartphone. The results are expressed as a percentage of the total CPU and memory usage on each phone. In FIG. 10A, it is observed that the CPU utilization is consistently around 12% and 13% for both phones. The minimum CPU usage for S6 and S5 is 9% and 10% respectively while the maximum CPU usage is 13% and 14% respectively for S5 and S6. Based on these results, the software-based defense adds a relatively minimal CPU overhead to the phone. From FIG. 10B, it is observed that memory usage of the software-based defense is predominantly below 0.3%. In all cases, the memory utilization of the defense is less than 0.7% making it an extremely low memory utilization service. These results when taken together suggest that the impact on the user should be minimal, with potentially slightly higher processing times but little impact on memory intensive applications such as browsers.

Adoption Impact Analysis for Energy Consumption and $CO_2$ Emissions

Because the modifications to the charging process result in increased power consumption relative to conventional chargers, it is instructive to evaluate the impact that this would have at scale if adoption was widespread. Some estimates for the additional energy consumption and $CO_2$ released are provided below if the defense mechanisms were to be widely adopted. Due to space limitations, the software-based defense mechanism was focused on. The Samsung S6 specifications were used for this evaluation.

To provide this estimate the following assumptions (with references) are used:

Average Battery Capacity: The S6's battery has 2550 mAh, 3.85V battery [15]. Although not every phone will be of the same type, it is believed that it is a satisfactory assumption for this estimate.

Active Zones: The defense mechanism once implemented would only activate when charging and in designated risk zones (e.g., airports) or at the user's request.

Locations for Evaluation: For the sake of this analysis, determining what type of location is likely to have the highest concentration of charging stations was tried. People are likely to require the assistance of a charging station for charging their device when they are away from home for long periods of time and have been using their phone consistently. Airports fit this scenario well, in part because available power outlets can be hard to find, making passengers more desperate to charge their devices. An additional factor making this a good choice is the way in which people from all around the world pass through airports, making themselves easier targets for entities such as intelligence agencies who might not be able to reach them under normal circumstances.

User Population: For the sake of this analysis, the population is limited to US airports. The number of individuals potentially using this defensive mechanism in US airports is no greater than the total number of air travelers in the country on a daily basis [12] (2.7 million). It is also assumed that each person going through an airport is only charging their phone once.

Defense Usage Rate: The percentage of individuals passing through an airport that would use the software-based defense cannot be predicted. Thus, the worst-case scenario for overall energy consumption and $CO_2$ emissions is assumed and 100% of travelers are using the defense.

Estimate of Increased Energy Consumption: Given that in FIG. 9, the charging times for the software solution increased by 4-11%, the increased power consumption was estimated. One way to think about this is to consider the increase in charging time to be equivalent to the battery having 4-11% more capacity. This is similar to the software defense consuming additional power and slowing down the charging process (which is what was seen in the experiments). Given the results on charging time, it was decided to take a pessimistic estimation of increased energy consumption, using 11% as the percentage increase for this analysis.

Miscellaneous Values: Metric tons of $CO_2$ per kWh is 0.0004554 [4]. The average car in the United States emits 4.6 metric tons of $CO_2$ per year [1].

Given these assumptions above, it was determined that 2.7 million daily airplane passengers over 365 days results in 1,064,266 kWh of additional energy usage over the course of a year. To calculate this number, the capacity of the battery is converted to Wh by multiplying the Ah and voltage values for the battery and take the 11% increase due to the software-based defense. This is then converted to kWh by multiplying by 2.7 million for the maximum number of users and 365 for the full year.

By converting this to metric tons of $CO_2$ emissions, it was found that this would produce 484 extra tons of $CO_2$ emissions, which is equivalent to approximately 105 additional average cars on the road for a year. While this is still not a large number it's also likely an over-estimation of the impact. It's highly unlikely that 100% of travelers through airports are going to be charging their phones with stations and using additional security measures. A more reasonable but still generous number might be closer to 1% of passengers, but for the sake of evaluating the worst-case scenario the results for the full 2.7 million travelers are provided.

Overall, these results indicate that the increased energy consumption due to the defense would not constitute a significant environmental threat even when widely deployed.

As previously described in reference to FIG. 2, one embodiment of the present invention provides a circuit that protects a device from an attack while the device is charging. The circuit includes an input voltage connector, an output voltage connector coupled to the input voltage connector via a voltage bus, a variable resistance circuit connected between the voltage bus and a ground bus, and a processor coupled to the variable resistance circuit, wherein the processor randomly changes a resistance of the variable resistance circuit.

In one aspect, a memory is integrated into or communicably coupled to the processor. In another aspect, the variable resistance circuit comprises a set of resistive circuits, each resistive circuit comprising a resistive element connected in series with a switching element. In another aspect, the each resistive element has a different resistance value. In another aspect, the resistive elements comprise one 10 $\Omega$ resistor, two 24 $\Omega$ resistors, one 28 $\Omega$ resistor, one 30 $\Omega$ resistor, one 50 $\Omega$ resistor, one 100 $\Omega$ resistor, one 150 $\Omega$ resistor, one 200 $\Omega$ resistor, and one 250 $\Omega$ resistor; and each switching element comprises a MOSFET gate coupled to the processor. In another aspect, the processor includes a random number generator that generates a binary number and each bit of the binary number is used to turn on or off the switching element associated with the bit. In another aspect, the processor changes the resistance of the variable resistance circuit at a rate of 1 kHz. In another aspect, the circuit is integrated into a mobile communications device, a scrambler unit, or a power charging device.

Figure 11:
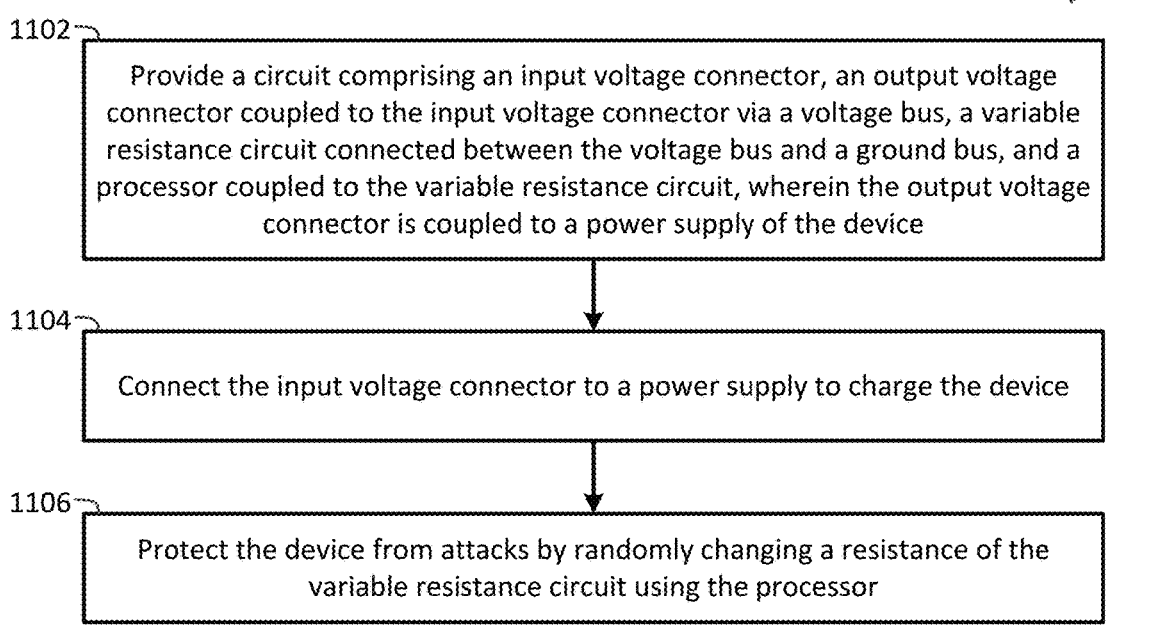
FIG. 11 depicts a method of protecting a device from attack while the device is charging in accordance with one embodiment of the present invention.

FIG. 11 depicts a method 1100 of protecting a device from attack while the device is charging in accordance with one embodiment of the present invention. A circuit is provided in block 1102, wherein the circuit comprises an input voltage connector, an output voltage connector coupled to the input voltage connector via a voltage bus, a variable resistance circuit connected between the voltage bus and a ground bus, and a processor coupled to the variable resistance circuit, wherein the output voltage connector is coupled to a power supply of the device. The input voltage connector is connected to a power supply to charge the device in block 1104.

The device is protected from attacks by randomly changing a resistance of the variable resistance circuit using the processor in block 1106.

In one aspect, the circuit further comprises a memory integrated into or communicably coupled to the processor. In another aspect, the variable resistance circuit comprises a set of resistive circuits, each resistive circuit comprising a resistive element connected in series with a switching element. In another aspect, each resistive element has a different resistance value. In another aspect, the resistive elements comprise one 10 Ω resistor, two 24 Ω resistors, one 28 Ω resistor, one 30 Ω resistor, one 50 Ω resistor, one 100 Ω resistor, one 150 Ω resistor, one 200 Ω resistor, and one 250 Ω resistor; and each switching element comprises a MOSFET gate coupled to the processor. In another aspect, randomly changing the resistance of the variable resistance circuit comprises generating a binary number using a random number generator, wherein each bit of the binary number is used to turn on or off the switching element associated with the bit. In another aspect, the processor changes the resistance of the variable resistance circuit at a rate of 1 kHz. In another aspect, the circuit is integrated into a mobile communications device, a scrambler unit, or a power charging device.

Figure 12:
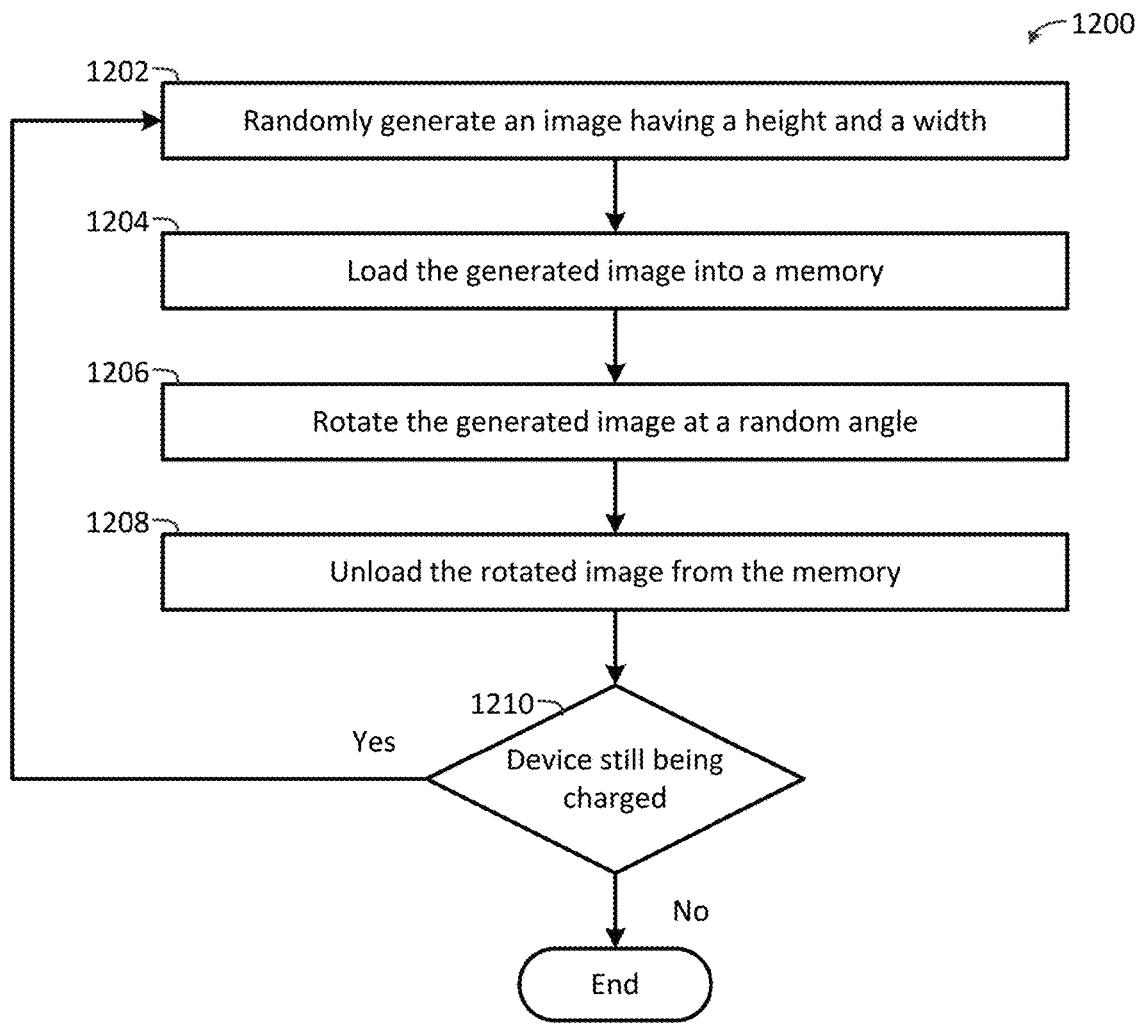
FIG. 12 depicts a method of protecting a device from attack while the device is charging in accordance with one embodiment of the present invention.

FIG. 12 depicts a method 1200 of protecting a device from attack while the device is charging in accordance with one embodiment of the present invention. An image having a height and a width is randomly generated in block 1202. The generated image is loaded in a memory in block 1204. The generated image is rotated at a random angle in block 1206. The rotated image is unloaded from memory in block 1208. The foregoing steps are repeated while the device is being charged in decision block 1210.

In one aspect, the method further comprises determining the height and the width. In another aspect, the method further determines the random angle using a rotating matrix. In another aspect, the method further comprises: detecting the attack; and scaling the height and the width up or down depending on the attack. In another aspect, the method further comprises determining whether the device is being charged. In another aspect, the method is performed by a software application executed by a processor of the device. In another aspect, the method further comprises loading the software application on the device.

Figure 13:
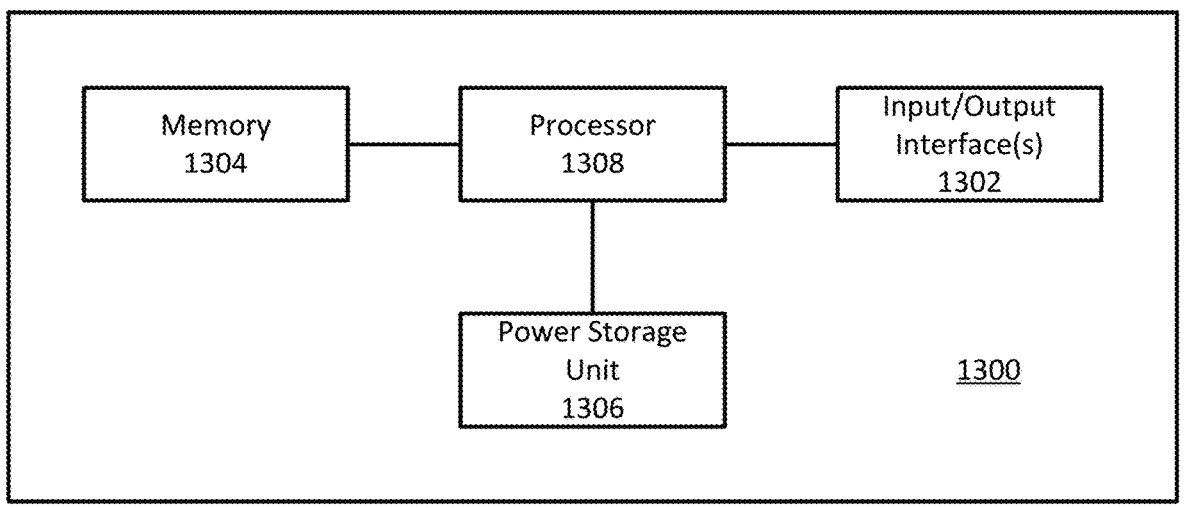
FIG. 13 is a block diagram of a device in accordance with another embodiment of the present invention.

FIG. 13 is a block diagram of a device 1300 in accordance with another embodiment of the present invention. The device 1300 includes: one or more input/output interfaces 1302; a memory 1304; a power storage unit 1306; and a processor 1308 communicably coupled to the one or more input/output devices 1302, the memory 1304, and the power storage unit 1306, wherein the processor 1308 randomly generates an image having a height and a width, loads the generated image in the memory 1304, rotates the generated image at a random angle, unloads the rotated image from the memory 1304, and repeats the foregoing steps while the device is being charged.

In one aspect, the processor determines the height and the width. In another aspect, the processor determines the random angle using a rotating matrix. In another aspect, the processor detects the attack, and scales the height and the width up or down depending on the attack. In another aspect, the processor determines whether the power storage unit is being charged.

Discussion and Conclusions

As described herein, two highly effective measures against power analytics attacks on smartphone charging systems are demonstrated. In addition to the detailed discussion of the design and implementation of the defensive methods, an analysis of the impact of the defenses on the experience of the user is also provided. The results show a minimal impact on the user through increased charging times (less than 10% increase) or additional resource consumption (CPU and Memory) on their phone.

By reducing the efficacy of multiple state-of-the-art power analytics attacks to the point of random guessing it has been demonstrated the effectiveness of the two defensive mechanisms. The hardware and software-based defense mechanisms leverage random noise to perturb the current drawn during charging and mask the identifying patterns of activities on the phone. For each of the presented attacks, its baseline performance is proved and then both defenses are evaluated under two different attack scenarios. These defensive measures were effective even when the attacker was aware of the defenses and trained their models with defensive data.

These results confirm that the principle of the defenses work under a reasonable set of assumptions. To further enhance the hardware defense against adversaries who might augment the traditional training process with some form of brute-force over the (small) 8 to 10 bit space, one could simply extend the same core principles to a larger bit space to fend off such adversaries. Similarly, one could make modifications to the software defense to add additional complexity. This could be accomplished either by increasing the size of the image, investigating different operations to use, or finding new ways to make it more unpredictable. Note that additional evaluation of the implications for charging time and resource consumption on the phone is recommended. Additional investigation may include methods of countering the defensive approaches described herein, as well as exploring other potential targets of power analytics attacks.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein.

Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

REFERENCES

1. United States Environmental Protection Agency. 2019. Greenhouse Gas Emissions from a Typical Passenger Vehicle. Retrieved Dec. 4, 2019 from https://www.epa.gov/greenvehicles/greenhouse-gas-emissions-typical-passenger-vehicle
2. Jude A Ambrose, Roshan G Ragel, and Sri Parameswaran. 2012. Randomized instruction injection to counter power analysis attacks. ACM Transactions on Embedded Computing Systems (TECS) 11, 3 (2012), 69.
3. Leo Breiman. 2001. Random forests. Machine learning 45, 1 (2001), 5-32.
4. Carbonfund.org. 2019. How We Calculate. Retrieved Dec. 4, 2019 from http://www.carbonfund.org/how-we-calculate
5. Antonin Carette, Mehdi Adel Ait Younes, Geoffrey Hecht, Naouel Moha, and Romain Rouvoy. 2017. Investigating the energy impact of android smells. In 24th International IEEE Conference on Software Analysis, Evolution and Reengineering (SANER). IEEE, 10.
6. Aaron Carroll and Gernot Heiser. 2013. The systems hacker's guide to the galaxy energy usage in a modern smartphone. In Proceedings of the 4th Asia-Pacific Workshop on Systems. ACM, 5.
7. Aaron Carroll, Gernot Heiser, et al. 2010. An Analysis of Power Consumption in a Smartphone. In USENIX annual technical conference, Vol. 14. Boston, MA, 21-21.
8. Claude Castelluccia and Pars Mutaf. 2005. Shake them up!: a movement-based pairing protocol for cpu-constrained devices. In Proceedings of the 3rd international conference on Mobile systems, applications, and services. ACM, 51-64.
9. Fangming Chai and Kyoung-Don Kang. 2018. A New Power Analysis Attack and a Countermeasure in Embedded Systems.
10. Chih-Chung Chang and Chih-Jen Lin. 2011. LIBSVM: A library for support vector machines. ACM transactions on intelligent systems and technology (TIST) 2, 3 (2011), 27.
11. The Pokémon Company. 2019. Pokémon Go. Retrieved Dec. 4, 2019 from https://www.pokemongo.com/en-us/
12. The FAA. 2019. Air Traffic By The Numbers. Retrieved Dec. 4, 2019 from https://www.faa.gov/air_traffic/by_the_numbers/
13. Google. 2019. Google Fit. Retrieved Dec. 4, 2019 from https://www.google.com/fit/

14. Google. 2019. Google Play Books. Retrieved Dec. 4, 2019 from https://play.google.com/store/apps/details?id=com.google.android.apps.books
15. Joshua Ho. 2019. The Samsung Galaxy S6 and S6 Edge Review. Retrieved Dec. 4, 2019 from https://www.anandtech.com/show/9146/the-samsung-galaxy-s6-and-s6-edge-review/3
16. Paul C. Kocher, Joshua Jaffe, and Benjamin Jun. 1999. Differential Power Analysis. In Proceedings of the 19th Annual International Cryptology Conference on Advances in Cryptology (CRYPTO '99). Springer-Verlag, Berlin, Heidelberg, 388-397. http://dl.acm.org/citation.cfm?id=646764.703 989
17. Pavel Lifshits, Roni Forte, Yedid Hoshen, Matt Halpern, Manuel Philipose, Mohit Tiwari, and Mark Silberstein. 2018. Power to peep-all: Inference Attacks by Malicious Batteries on Mobile Devices. Proceedings on Privacy Enhancing Technologies 2018, 4 (2018), 141-158.
18. M. Masoumi. 2019. Novel Hybrid CMOS/Memristor Implementation of the AES Algorithm Robust against Differential Power Analysis Attack. IEEE Transactions on Circuits and Systems II: Express Briefs (2019), 1-1. https://doi.org/10.1109/TC SII.2019.2932337
19. Yi Qin and Chuan Yue. 2018. Website Fingerprinting by Power Estimation Based Side-Channel Attacks on Android 7. In 2018 17th IEEE International Conference On Trust, Security And Privacy In Computing And Communications/12th IEEE International Conference On Big Data Science And Engineering. IEEE, 1030-1039.
20. scikit learn. 2019. Machine Learning in Python. Retrieved Dec. 9, 2019 from https://scikit-learn.org/stable/
21. SyNetDev. 2019. Stay Alive! Keep screen awake. Retrieved Dec. 4, 2019 from https://play.google.com/store/apps/details?id=com.synetics.stay.alive&hl=en
22. The Veloxity Team. 2019. Survey Report: Cell Phone Battery Statistics 2015-2018. Retrieved Dec. 4, 2019 from https://veloxity.us/2015-phone-battery-statistics/
23. Boris Veytsman. 2017. The top 500 sites on the web. Retrieved May 27, 2017 from https://www.alexa.com/topsites/global
24. LLC WebMD. 2019. WebMD. Retrieved Dec. 4, 2019 from https://play.google.com/store/apps/details?id=com.webmd.android
25. Lin Yan, Yao Guo, Xiangqun Chen, and Hong Mei. 2015. A study on power side channels on mobile devices. In Proceedings of the 7th Asia-Pacific Symposium on Internetware. ACM, 30-38.
26. Qing Yang, Paolo Gasti, Gang Zhou, Aydin Farajidavar, and Kiran S Balagani. 2017. On inferring browsing activity on smartphones via USB power analysis side-channel. IEEE Transactions on Information Forensics and Security 12,5 (2017), 1056-1066.

What is claimed is:

1. A circuit that protects a device from an attack while the device is charging, the circuit comprising:
an input voltage connector configured to receive a voltage to charge the device;
an output voltage connector coupled to the input voltage connector via a voltage bus, wherein the output voltage connector is configured to charge the device;
a variable resistance circuit connected between the voltage bus and a ground bus; and
a processor coupled to the variable resistance circuit, wherein the processor randomly changes a resistance of the variable resistance circuit in order to change a current at the input voltage connector and mask a current at the output voltage connector.

2. The circuit of claim 1, further comprising a memory integrated into or communicably coupled to the processor.

3. The circuit of claim 1, wherein the variable resistance circuit comprises a set of resistive circuits, each resistive circuit comprising a resistive element connected in series with a switching element.

4. The circuit of claim 3, wherein the each resistive element has a different resistance value.

5. The circuit of claim 3, wherein:
the resistive elements comprise one 100Ω resistor, two 240Ω resistors, one 280Ω resistor, one 300Ω resistor, one 500Ω resistor, one 1000Ω resistor, one 1500 resistor, one 2000 resistor, and one 2500Ω resistor; and
each switching element comprises a MOSFET gate coupled to the processor.

6. The circuit of claim 3, wherein the processor includes a random number generator that generates a binary number and each bit of the binary number is used to turn on or off the switching element associated with the bit.

7. The circuit of claim 1, wherein the processor changes the resistance of the variable resistance circuit at a rate of 1 kHz.

8. The circuit of claim 1, wherein the circuit is integrated into a mobile communications device, a scrambler unit, or a power charging device.

9. A method of protecting a device from an attack while the device is charging, the method comprising:
providing a circuit comprising an input voltage connector, an output voltage connector coupled to the input voltage connector via a voltage bus, a variable resistance circuit connected between the voltage bus and a ground bus, and a processor coupled to the variable resistance circuit, wherein the output voltage connector is coupled to a power supply of the device;
connecting the input voltage connector to a power supply to charge the device; and
protecting the device from attacks by randomly changing a resistance of the variable resistance circuit using the processor in order to change a current at the input voltage connector and mask a current at the output voltage connector.

10. The method of claim 9, wherein the circuit further comprises a memory integrated into or communicably coupled to the processor.

11. The method of claim 9, wherein the variable resistance circuit comprises a set of resistive circuits, each resistive circuit comprising a resistive element connected in series with a switching element.

12. The method of claim 11, wherein each resistive element has a different resistance value.

13. The method of claim 11, wherein:
the resistive elements comprise one 100Ω resistor, two 240Ω resistors, one 280Ω resistor, one 300Ω resistor, one 500Ω resistor, one 1000Ω resistor, one 1500Ω resistor, one 2000Ω resistor, and one 2506Ω resistor; and
each switching element comprises a MOSFET gate coupled to the processor.

14. The method of claim 11, wherein randomly changing the resistance of the variable resistance circuit comprises generating a binary number using a random number generator, wherein each bit of the binary number is used to turn on or off the switching element associated with the bit.

15. The method of claim 11, wherein the processor changes the resistance of the variable resistance circuit at a rate of 1 kHz.

16. The method of claim 9, wherein the circuit is integrated into a mobile communications device, a scrambler unit, or a power charging device.

* * * * *